Nov. 22, 1955  P. L. HOWARD  2,724,734
ELECTRODE FOR ELECTRIC BATTERIES
Filed Nov. 22, 1952
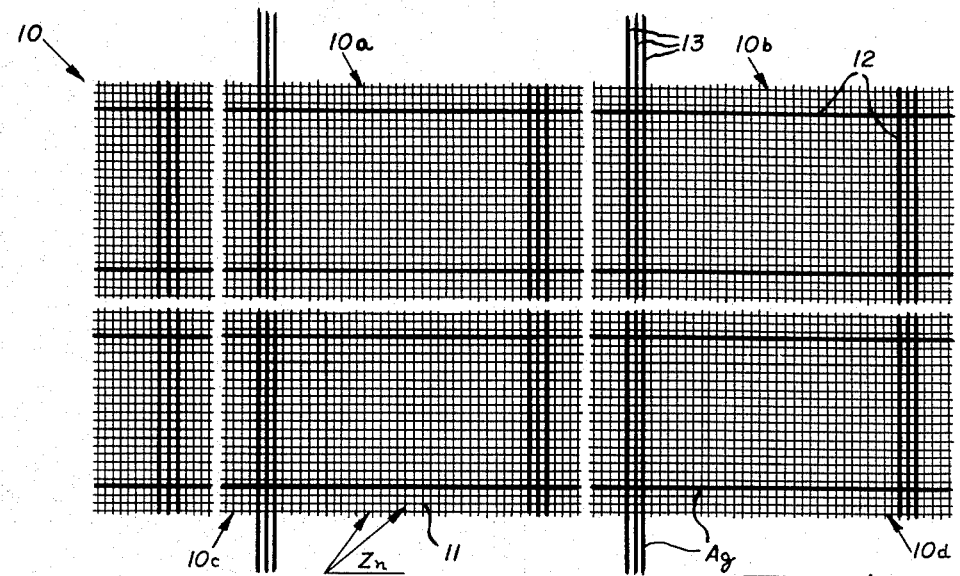
Fig. 1
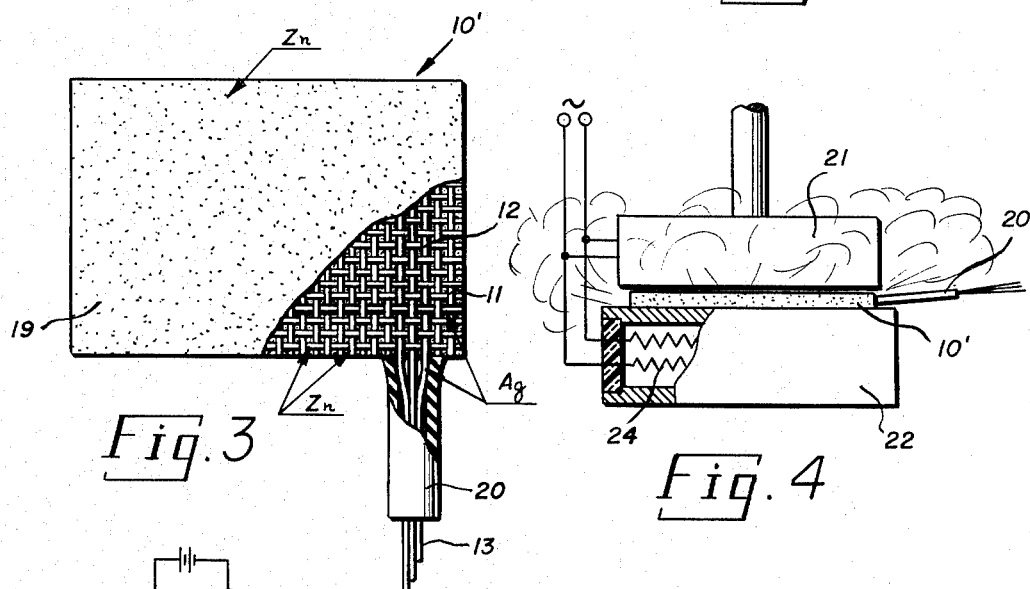
Fig. 3
Fig. 4
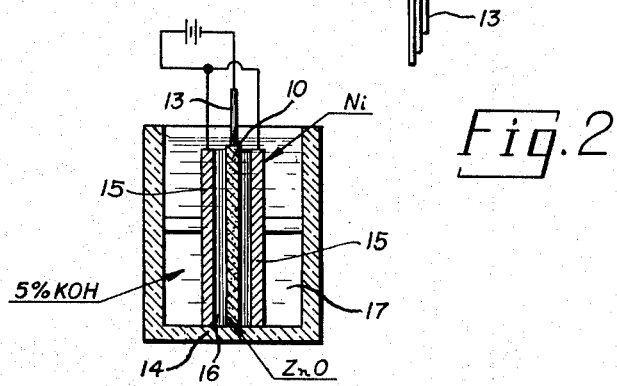
Fig. 2
PAUL L. HOWARD
INVENTOR.
BY
AGENT

United States Patent Office 2,724,734
Patented Nov. 22, 1955

2,724,734

ELECTRODE FOR ELECTRIC BATTERIES

Paul L. Howard, Harrington Park, N. J., assignor to Yardney International Corp., New York, N. Y., a corporation of New York Application November 22, 1952, Serial No. 322,047

4 Claims. (Cl. 136—34)

My present invention relates to electrodes for electric batteries, more particularly (but not exclusively) to zinc-containing electrodes adapted to be used as the negative of, say, a zinc-silver battery or accumulator, and to a method of making such electrodes.

Heretofore, zinc electrodes adapted for use in high-capacity batteries have usually been produced with the aid of a grid or similar support of zinc, magnesium or the like which was packed with powdered zinc oxide to form a flat plate whose mechanical stability, owing to the poor cohesion of the zinc oxide powder, was quite limited. In order to convert such electrodes to a state corresponding to that of a charged battery element, it is necessary to reduce the zinc oxide thereof to metallic zinc which may take place either before assembly or in an initial charging cycle of the finished cell. In the first case there is grave danger of partial re-oxidation of the reduced zinc during handling, whereas in the second instance a certain polarization will usually occur and will prevent full reduction of the active electrode material; thus some loss of capacity will result with either method.

It is, accordingly, an object of my present invention to provide a battery electrode incorporating a readily oxidizable active material in the metallic state, so as to be usable without further treatment as a component of an initially charged battery cell.

More particularly, it is an object of this invention to provide an electrode plate consisting, in the main, of a readily oxidizable active material in compacted metallic condition.

It is also an object of this invention to provide a process for making an electrode of the character just described without risk of oxidation of any appreciable part of the active material.

Another object of my invention is to provide an electrode of the character set forth above wherein the metallic active material is in intimate contact with conductor means forming a current-distributing network and a terminal lead therefor.

I have found, in accordance with the present invention, that the foregoing objects may be realized by a process which includes forming an electrode body by packing a suitable support with an oxidation product of the active material, such as zinc oxide, thereafter reducing said compound by electrolytic treatment, washing the electrode body and drying it by rapid heating in a non-oxidizing atmosphere. The last-mentioned step may advantageously be carried out by introducing the wet, washed electrode body into a heating chamber which is narrow enough to let the developing steam completely envelop the exposed portions of the electrode, thereby denying access to the ambient air. Electrodes so produced have been found to be highly stable both mechanically and electrically; they do not require as much pressure as conventional zinc oxide electrodes to prevent their disintegration during cycling, hence inter-electrode separating layers of a more spongy character, capable of storing larger quantities of electrolyte and affording better irrigation, may be used in connection therewith.

I have also found, in accordance with another feature of this invention, that the packing of the support with zinc oxide may be readily accomplished by mixing the zinc oxide powder with a highly concentrated alkaline solution, such as 30% KOH. The support itself, according to still another feature of the invention, may be a network of zinc wires interwoven, if desired, with highly conductive wires (e. g. of silver) adapted to form a current-distributing network and to have their ends brought out of the electrode body in the form of a terminal lead.

The above and other objects and features of the invention will be better understood from the following detailed description, reference being had to the accompanying drawing in which:

Fig. 1 illustrates, somewhat diagrammatically, a wire network adapted to form a support for a number of electrodes according to the invention;

Fig. 2 diagrammatically illustrates the reduction step;

Fig. 3 is a plan view of a single electrode body formed from the network of Fig. 1, part of the metallic packing being broken away to expose the supporting wires; and Fig. 4 illustrates, partly in diagrammatic form, the step of drying the electrode of Fig. 2 in accordance with this invention.

In Fig. 1 there is shown a network or web 10 of interwoven zinc wires 11 and silver wires 12, the latter being distinguished from the former, in this diagrammatic illustration, by heavier lines. It will be noted that the number of silver wires 12, both in longitudinal and in transverse direction, is considerably less than the number of zinc wires 11 and that some of the transverse silver wires 12 have ends 13 projecting beyond the body of the network. It will also be seen that these wires form a recurring pattern enabling the network 10 to be subdivided, by longitudinal and transverse cutting, into a plurality of substantially identical grid structures such as 10a, 10b, 10c, 10d, each with its group of projecting terminal leads 13.

Either the entire network 10, before dissection, or each individual supporting structure 10a etc. is now packed with active material which may be in the form of a pasty mass comprising, for example, zinc oxide powder and 30% potassium hydroxide; a proportion of 22.5 grams of powder to 9 cc. of KOH has been found very satisfactory. The resulting plate 10' is now connected as a cathode in an electrolytic circuit, within a vessel 14 as shown in Fig. 2, along with one or more anode electrodes 15 of inert material, such as nickel or stainless steel, from which it is separated by suitable electrolyte-permeable spacers 16 and against which the electrode 10' is preferably applied under pressure. The electrolyte 17 used in this treatment may comprise 5% KOH, thus an alkaline solution whose concentration is considerably lower than the concentration of either the binder used for the packing of the grid structure or the electrolyte employed in the finished battery. The charge delivered by a source 18 may, on the other hand, be substantially greater than the rated charge of the electrode within the battery, being, for example, double the rated charge.

The so treated electrode 10, whose active material 19 has thus been reduced to metallic zinc, is shown in Fig. 3. The projecting ends 13 of some of the silver wires 12 may be brought together within a suitable insulating sheath, such as a rubber sleeve 20, to protect them from attack by the electrolyte. Next this electrode is washed and, while still wet, is inserted between two heated plates 21, 22 whose spacing is only slightly in excess of the thickness of the plate 10', thereby forming a heating chamber small enough to insure that the plate will be enveloped by superheated steam, as shown, to shut out the atmosphere. The heating of the plates 22, 23 may be effected electrically, e. g. by means of resistance elements such as shown schematically at 24, and should produce a temperature well above the boiling point of water, e. g. of about 200° C. After a brief insertion, of ordinarily not more than a few seconds, the electrode 10' is withdrawn and is now ready for use.

The invention is, of course, not limited to the precise embodiment described and illustrated. By way of example it may be mentioned that the silver wires 12 may be spaced uniformly instead of being arranged in distinct transverse groups, as shown in Fig. 1, and that, if desired, most or all of said wires may be provided with projecting ends 13 adapted to be combined to a terminal lead. It may also be mentioned that another desirable type of support consists of a serrated type of grid having a honeycomb pattern of perforations stamped at an angle from a thin metal plate, preferably with an integral solid portion serving as a terminal tab. Grids of this latter type are capable of absorbing a large amount of paste in their interstices and may be packed in comparatively simple manner, without the application of any pressure, between two blotters which can be readily stripped off after the paste has partially dried; an analogous process may be used for the manufacture of positive silver electrodes, in which case the packing would consist of silver oxide paste which could then be consolidated by sintering and converted electrolytically to silver peroxide.

I claim:

1. The method of making an electrode for electric batteries which comprises forming an electrode body from an electrochemically active material in oxidized condition, reducing said active material by cathodic treatment of said electrode body in an electrolytic bath, removing said electrode body from said bath, washing said electrode body in water, and drying said electrode body by introducing said body for a time not exceeding a few seconds into a space preheated above the boiling point of water, said space being sufficiently restricted to cause the developing vapor to envelop said body and substantially to exclude the atmosphere therefrom.

2. The method of making an electrode for electric batteries which comprises forming an electrode body from an electrochemically active material including at least a major proportion of zinc oxide, reducing said zinc oxide by cathodic treatment of said electrode body in an electrolytic bath, removing said electrode body from said bath, washing said electrode body in water, and drying said electrode body by introducing said body for a time not exceeding a few seconds into a space preheated above the boiling point of water, said space being sufficiently restricted to cause the developing vapor to envelop said body and substantially to exclude the atmosphere therefrom.

3. The method of making an electrode for electric batteries which comprises forming an electrode plate from an electrochemically active material in oxidized condition, reducing said active material by cathodic treatment of said electrode plate in an electrolytic bath, removing said electrode plate from said bath, washing said electrode plate in water, providing a space sufficient to receive said plate between a pair of heated members spaced apart by slightly more than the thickness of said plate, heating said space to a temperature above the boiling point of water, and drying said plate by introducing it into said heated space for a time not exceeding a few seconds, said space being sufficiently restricted to cause the developing vapor to envelop said plate and substantially to exclude the atmosphere therefrom.

4. The method of making an electrode for electric batteries which comprises forming an electrode plate from an electrochemically active material including at least a major proportion of zinc oxide, reducing said zinc oxide by cathodic treatment of said electrode plate in an electrolytic bath, removing said electrode plate from said bath, washing said electrode plate in water, and drying said electrode plate by introducing said plate for a time not exceeding a few seconds into a space preheated above the boiling point of water, said space being sufficiently restricted to cause the developing vapor to envelop said plate and substantially to exclude the atmosphere therefrom.

References Cited in the file of this patent

UNITED STATES PATENTS

| Number | Name | Date |
| --- | --- | --- |
| 489,315 | Michel | Jan. 3, 1893 |
| 940,043 | Morrison | Nov. 16, 1909 |
| 994,451 | Fredickson | June 6, 1911 |
| 1,228,551 | Grant | June 5, 1917 |
| 1,381,387 | Wright | June 14, 1921 |
| 1,895,397 | Pouchain | Jan. 24, 1933 |
| 2,050,172 | Gordon | Aug. 4, 1936 |
| 2,389,894 | Chubb et al. | Nov. 27, 1945 |
| 2,561,943 | Moulton | July 24, 1951 |
| 2,594,710 | Andre | Apr. 29, 1952 |
| 2,654,795 | Brill et al. | Oct. 6, 1953 |